United States Patent [19]

Habermeier et al.

[11] 3,932,176

[45] Jan. 13, 1976

[54] DIACRYLIC ACID ESTER DERIVATIVES OF BIS-HYDANTOIN COMPOUNDS

[75] Inventors: Juergen Habermeier, Pfeffingen/Bäseland; Daniel Porret, Binningen, both of Switzerland

[73] Assignee: Ciba-Geigy Corporation, Ardsley, N.Y.

[22] Filed: May 20, 1974

[21] Appl. No.: 471,407

Related U.S. Application Data

[62] Division of Ser. No. 241,386, April 5, 1972, Pat. No. 3,852,302.

[30] Foreign Application Priority Data

Apr. 16, 1971  Switzerland.......................... 5557/71

[52] U.S. Cl. ............................................ 260/309.5
[51] Int. Cl.² ......................................... C07D 49/32
[58] Field of Search ................................. 260/309.5

[56] References Cited
UNITED STATES PATENTS

| | | | |
|---|---|---|---|
| 3,369,010 | 2/1968 | Kelley | 260/309.5 X |
| 3,374,242 | 3/1968 | Kelley | 260/309.5 |
| 3,808,226 | 4/1974 | Habermeier et al. | 260/309.5 |
| 3,852,302 | 12/1974 | Habermeier et al. | 260/309.5 |

*Primary Examiner*—Ethel G. Love
*Attorney, Agent, or Firm*—Luther A. R. Hall

[57] ABSTRACT

New diacrylates are obtained by a process in which oxalkylated bis-hydantoins are esterified with acrylic acid and/or methacrylic acid, or transesterified with acrylic acid ester and/or methacrylic acid ester.

The new diacrylates are low-viscous liquids, which can be easily processed by virtue of their consistency; and the polymerisates produced therefrom, are distinguished by good flexural strength and high transparency.

3 Claims, No Drawings

DIACRYLIC ACID ESTER DERIVATIVES OF BIS-HYDANTOIN COMPOUNDS

This is a division of application Ser. No. 241,386, filed on Apr. 5, 1972, now U.S. Pat. No. 3,852,302 issued Dec. 3, 1974.

The present invention relates to new diacrylic acid esters of the general formula:

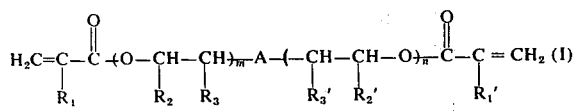

wherein $R_1$, $R_1'$, $R_3$ and $R_3'$ each independently stand for a hydrogen atom or the methyl group, $R_2$ and $R_2'$ each independently stand for a hydrogen atom, an alkyl group, an alkyl group interrupted by oxygen atoms, or a phenyl group, or wherein $R_2$ and $R_3$ or $R_2'$ and $R_3'$ together represent the trimethylene or tetramethylene radical, m and n each stand for a whole number to the value of 1 to 30, preferably 1 to 4, and A represents an organic radical containing at least once the grouping:

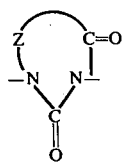

wherein Z represents a bivalent radical necessary for the completion of a five- or six-membered, unsubstituted or substituted, heterocyclic ring.

The radical Z in the N-heterocyclic grouping of formula I preferably contains only carbon and hydrogen atoms, or carbon, hydrogen and oxygen atoms. It can, for example, be a radical of the formulae:

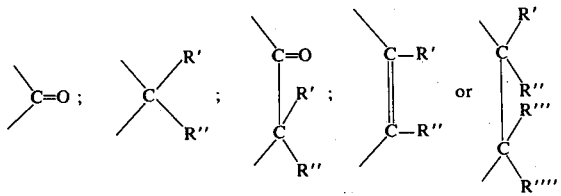

wherein R', R'', R''', and R'''' can each independently represent a hydrogen atom or, e.g. an alkyl radical, preferably a lower alkyl radical having 1–4 carbon atoms, an alkenyl radical, preferably a lower alkylene radical having 1–4 carbon atoms, a cycloalkyl radical, or an optionally substituted phenyl radical.

The new diacrylic acid esters of formula I can be produced by a process in which dihydroxy compounds of the general formula

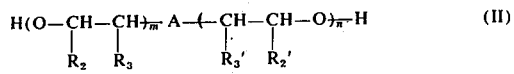

wherein $R_2$, $R_2'$, $R_3$, $R_3'$, m, n and A have the same meanings as in formula I are esterified, in a manner known per se, with acrylic acid and/or methacrylic acid; or transesterified, in a manner known per se, with acrylic acid ester and/or methacrylic acid ester.

With the direct esterification of dihydroxy compounds of formula II with acrylic acid and/or methacrylic acid, the reactants are preferably condensed in approximately stoichiometric amounts with the use of an inert azeotropiser. These reactions are usually catalysed with acid. In the processing of the reaction solutions they are washed until free from acid, concentrated by evaporation, provided with stabilisers, and then dried in vacuo to constant weight.

With regard to the transesterification of dihydroxy compounds of formula II with acrylic acid esters and/or methacrylic acid esters, it is preferable to use acrylic acid esters or methacrylic acid esters of lower aliphatic alcohols, and preferably in a stochiometric excess. The transesterification reactions are catalysed with acids. The lower aliphatic alcohol forming during this reaction is continuously distilled off from the mixture. The excess monoacrylic acid ester or monomethacrylic acid ester is likewise removed by distillation from the reaction mixture. The crude product is then dissolved in an organic inert solvent, e.g. in benzene, and processed according to the procedure for the reaction solutions obtained by esterification.

The dihydroxy compounds of formula II are known compounds and can be produced by the addition to the NH-groups of N-heterocyclic compounds containing at least once the grouping:

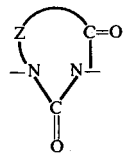

wherein Z represents a bivalent radical which is necessary for the completion of a five- or six-membered, unsubstituted or substituted heterocyclic ring, of alkene oxides of the formulae:

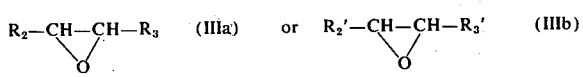

wherein $R_2$ and $R_3$ or $R_2'$ and $R_3'$ have the same meaning as in formula I, in the presence of a suitable catalyst. The following are mentioned as suitable representative alkene oxides: ethylene oxide, propylene oxide, a-butylene oxide, 1,2-cyclopentene oxide or 1,2-cyclohexene oxide, styrene oxide and glycidol alkyl ether, such as butyl-, amyl-, octyl- or dodecenyl-glycidol.

The dihydroxy compounds of formula II used for the production of the new diacrylic acid esters of formula I are, in particular, mononuclear and binuclear N-heterocyclic dihydroxy compounds.

The mononuclear dihydroxy compounds of formula II correspond to the general formula:

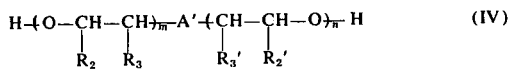

wherein $R_2$, $R_2'$, $R_3$, $R_3'$, m and n have the same meanings as in formula I, and A' represents an organic radical containing once the grouping:

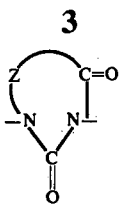

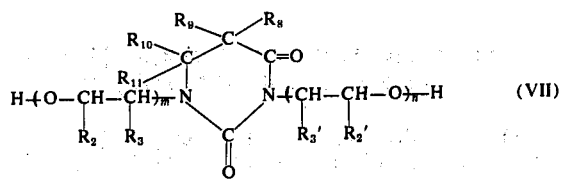

wherein Z represents a bivalent radical which is necessary for the completion of a five- or six-membered, unsubstituted or substituted heterocyclic ring.

A preferred subclass of mononuclear N-heterocyclic dihydroxy compounds of formula IV corresponds to the formula:

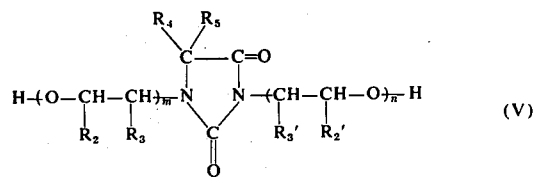

wherein $R_2$, $R_2'$, $R_3$, $R_3'$, m and n have the same meanings as in formula IV, and wherein $R_4$ and $R_5$ each represent a hydrogen atom or a lower alkyl radical having 1 to 4 carbon atoms, or wherein $R_3$ and $R_4$ together represent a trimethylene or tetramethylene radical; representative of this class of compounds are, e.g.:

1,3-di-(β-hydroxyethyl)-5,5-dimethylhydantoin, 1,3-di-(β-hydroxy-n-propyl)-5,5-dimethylhydantoin, 1,3-di-(β-hydroxyethoxyethoxyethyl)-5,5-dimethylhydantoin, 1,3-di-(β-hydroxy-n-propyl)-5-isopropylhydantoin, 1,3-di-(β-hydroxy-n-propyl)-5,5-diethylhydantoin, 1,3-di-(β-hydroxy-n-propyl)-5-ethyl-5-methylhydantoin, 1,3-di-(β-hydroxy-n-butyl)-5,5-dimethylhydantoin, 1,3-di-(β-hydroxy-n-butyl)-5,5-dimethylhydantoin, 1,3-di-(β-hydroxy-γ-n-butoxy-n-propyl)-5,5-dimethylhydantoin, 1,3-di-(β-hydroxycyclohexyl)-5,5-dimethylhydantoin, 1,3-di-(β-hydroxy-β-phenylethyl)-5,5-dimethylhydantoin, 1,3-di-(β-hydroxy-β-phenylethoxy-β-phenylethoxy-β-phenylethyl)-5,5-dimethylhydantoin and 1,3-di-(β-hydroxy-β-phenylethyl)-5-isopropylhydantoin.

A further subclass of mononuclear N-heterocyclic dihydroxy compounds according to formula IV corresponds to the formula:

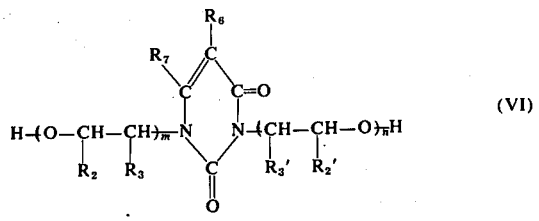

wherein $R_2$, $R_2'$, $R_3$, $R_3'$, m and n have the same meanings as in formula IV, and wherein $R_6$ and $R_7$ each independently represent a hydrogen atom or a lower alkyl radical having 1 to 4 carbon atoms; representative of this class of compounds are, e.g.:

1,3-di-(β-hydroxy-n-propyl)-5-methyluracil, 1,3-(β-hydroxy-n-butyl)-uracil and 1,3-di-(β-hydroxy-β-phenylethyl)-6-methyluracil.

A further preferred subclass of mononuclear N-heterocyclic dihydroxy compounds of formula IV correspond to the general formula:

wherein $R_2$, $R_2'$, $R_3$, $R_3'$, m and n have the same meanings as in formula IV, and wherein $R_8$ and $R_9$ each represent a hydrogen atom or identical or different alkyl radicals, preferably alkyl radicals having 1 to 4 carbon atoms, and $R_{10}$ and $R_{11}$ each independently represent a hydrogen atom or a preferably lower alkyl radical having 1–4 carbon atoms.

Representative of this class of compounds are, e.g. 1,3-di-(β-hydroxyethyl)-5,5-dimethyl-6-isopropyl-5,6-dihydrouracil, 1,3-di-(β-hydroxy-n-propyl)-5,5-dimethyl-6-isopropyl-5,6-dihydrouracil, 1,3-di-(β-hydroxycyclohexyl)-5,5-dimethyl-5,6-dihydrouracil and 1,3-di-(β-hydroxy-β-phenylethyl)-5,5-dimethyl-6-isopropyl-5,6-dihydrouracil.

A further preferred subclass of mononuclear N-heterocyclic dihydroxy compounds of formula IV corresponds to the general formula:

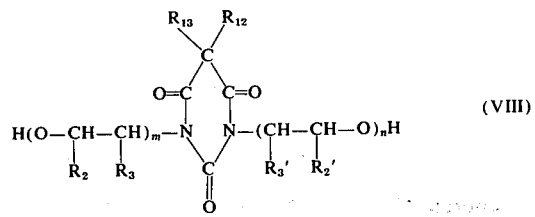

wherein $R_2$, $R_2'$, $R_3$, $R_3'$, m and n have the same meanings as in formula IV, and wherein $R_{12}$ and $R_{13}$ each independently represent a hydrogen atom, an alkyl radical, an alkenyl radical, a cycloalkyl or -alkenyl radical, or an unsubstituted or substituted phenyl radical. The following are mentioned as being representative of this class of compounds:

1,3-di-(β-hydroxyethyl)-5-phenyl-5-ethylbarbituric acid, 1,3-di-(β-hydroxy-n-propyl)-5,5-diethylbarbituric acid, 1,3-di-(β-hydroxycyclohexyl)-5,5-dimethylbarbituric acid and 1,3-di-(β-hydroxy-β-phenylethyl)-5-ethyl-5-phenylbarbituric acid.

Furthermore, reference is made to the corresponding dihydroxy compounds of parabanic acid.

The binuclear dihydroxy compounds according to formula II used for the production of the new diacrylic acid esters of formula I correspond to the general formula:

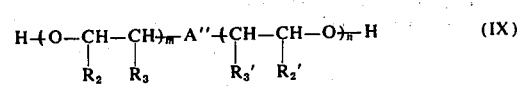

wherein $R_2$, $R_2'$, $R_3$, $R_3'$, m and n have the same meanings as in formula I, and A″ represents an organic radical of the formula:

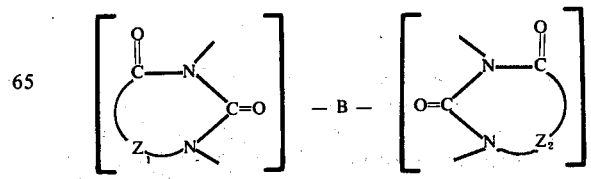

in which $Z_1$ and $Z_2$ each independently represent a bivalent radical which is necessary for completion of a five- or six-membered, unsubstituted or substituted heterocyclic ring, and B stands for a bivalent aliphatic, cycloaliphatic or araliphatic radical, preferably for an alkylene radical or for an alkylene radical interrupted by oxygen atoms.

A preferred subclass of bivalent dihydroxy compounds of formula IX corresponds to the general formula:

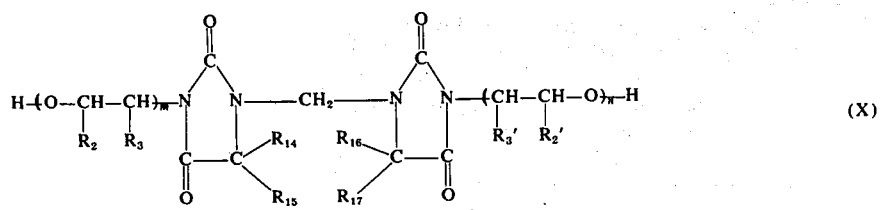

wherein $R_2$, $R_2'$, $R_3$, $R_3'$, $m$ and $n$ have the same meanings as in formula IX, and wherein $R_{14}$, $R_{15}$, $R_{16}$ and $R_{17}$ each represent a hydrogen atom or a lower alkyl radical having 1 to 4 carbon atoms, or wherein $R_3$ and $R_4$ or $R_5$ and $R_6$ together represent a trimethylene or tetramethylene radical. Representative compounds of this class are, e.g.:

1,1'-methylene-bis-[3-β-hydroxyethyl)-5,5-dimethylhydantoin], 1,1'-methylene-bis-[3-(β-hydroxyethoxyethoxyethyl)-5,5-dimethylhydantoin], 1,1'-methylene-bis-[3-(β-hydroxy-n-propyl)-5,5-dimethylhydantoin], 1,1'-methylene-bis-[3-(β-hydroxy-n-propyl)-5-isopropylhydantoin], 1,1'-methylene-bis-[3-(β-hydroxy-n-butyl)-5,5-dimethylhydantoin], 1,1'-methylene-bis-[3-(β-hydroxy-β-phenylethyl)-5,5-dimethylhydantoin], 1,1'-methylene-bis-[3-(β-hydroxy-β-phenylethyl)-5,5-isopropylhydantoin] and 1,1'-methylene-bis-[3-(β-hydroxycyclohexyl)-5,5-dimethylhydantoin].

A further preferred subclass of binuclear dihydroxy compounds of formula IX corresponds to the general formula:

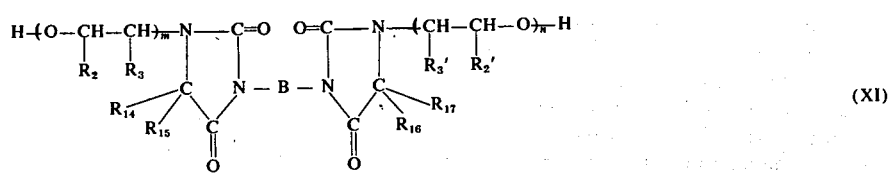

wherein $R_2$, $R_2'$, $R_3$, $R_3'$, $R_{14}$, $R_{15}$, $R_{16}$, $R_{17}$, $m$ and $n$ have the same meanings as in formula X, and B stands for a bivalent aliphatic, cycloaliphatic, araliphatic radical, preferably alkylene of 1–12 carbon atoms, or for an alkylene radical interrupted by oxygen atoms. Representative of this class of compounds are, e.g.:

1,4-bis-[1'-(β-hydroxyethyl)-5',5'-dimethylhydantoinyl-3']-butane, 1,6-bis-[1'-(β-hydroxyethyl)-5',5'-dimethylhydantoinyl-3']-hexane, 1,6-bis-[1'-(β-hydroxy-n-propyl)-5',5'-dimethylhydantoinyl-3'-hexane, 1,6-bis-[1'-(β-hydroxy-n-butyl)-5',5'-dimethylhydantoinyl-3'-hexane, 2,2'-bis-[1-(β-hydroxy-n-butyl)-5,5-dimethylhydantoinyl-3]-diethyl ether, 2,2'-bis-[1-(β-hydroxy-β-phenyl ethyl)-5,5-dimethylhydantoinyl-3]-diethyl ether and 1,12-bis-[1'-(β-hydroxy-β-phenyl ethyl)-5,5-dimethylhydantoinyl-3']-dodecane.

A further suitable preferred subclass contains binuclear dihydroxy compounds of the following formula:

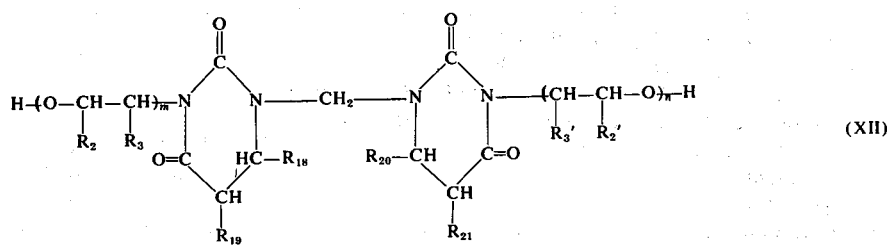

wherein $R_2$, $R_2'$, $R_3$, $R_3'$, $m$ and $n$ have the same meanings as in formula IX, and $R_{18}$, $R_{19}$, $R_{20}$ and $R_{21}$ each independently represent a hydrogen atom or a lower alkyl radical having 1 to 4 carbon atoms; representative of this class of compounds are, e.g.:

1,1'-methylene-bis-[3-(β-hydroxyethyl)-5,5-dimethyl-5,6-dihydrouracil] and 1,1'-methylene-bis-[3-(β-hydroxy-n-propyl)-5,5-dimethyl-5,6-dihydrouracil].

The new diacrylic acid esters of formula I are mostly low-viscous liquids which, by virtue of their consistency, can be easily processed.

The new diacrylic acid esters can be prevented from prematurely polymerising by the addition of the usual inhibitors, e.g. hydroquinone, phenothiazine, Cusalts, etc., and are distinguished by good stability in storage.

The diacrylic acid esters of formula I produced according to the invention are valuable resins which can be polymerised, either on their own or together with other polymerisable monomers, as moulded shapes or as flat-shaped articles. The polymerisates obtained in this manner are distinguished by high flexural strength and transparency.

Suitable monomers which can be added to the new diacrylic acid esters of formula I are, in particular, compounds of the acrylic acid series, such as esters from acrylic acid or methacrylic acid and alcohols or phenols, e.g. methylacrylate, ethylacrylate, butylacrylate, dodecylacrylate, methylmethacrylate, acrylonitrile, methacrylonitrile, ethylene glycol dimethacrylate. It is moreover possible to use other reactive olefinic unsaturated monomers such as, e.g. styrene, divinylbenzene, vinyl acetate, etc..

For polymerisation or copolymerisation the usual free-radical-forming catalysts are preferably used; mention may be made of hydrazine derivatives, e.g. hydrazine hydrochloride, organometallic compounds such as tetraethyllead, as well as, in particular aliphatic azo compounds such as $\alpha,\alpha'$-azobisisobutyronitrile and organic peroxides or peroxy salts such as, e.g. peroxyacetic acid, acetyl peroxide, chloroacetyl peroxide, trichloroacetyl peroxide, benzoyl peroxide, chlorobenzoyl peroxide, benzoylacetyl peroxide, propionyl peroxide, fluorochloropropionyl peroxide, lauryl peroxide, cumene hydroperoxide, cyclohexanone hydroperoxide, tert.-butyl hydroperoxide, di-tert.-butyl peroxide, di-tert.-amyl peroxide, p-menthane hydroperoxide; also inorganic peroxide compounds such as sodium peroxide, alkali percarbonates, alkali persulphates or alkali perborates, and especially hydrogen peroxide, which can advantageously replace the more expensive benzoyl peroxide. The addition thereof is governed, in a known manner, by the desired course of reaction, or by the desired properties of the polymerisate; advantageously, about 0.05 to 10 per cent by weight of catalyst is used, calculated on the total weight of the polyacrylate or polyacrylate/monomer mixture, the total amount of catalyst being added either altogether at the commencement or in portions during the course of the polymerisation process.

In certain cases it is also possible to use cationic or anionic catalysts.

The new diacrylic acid esters produced according to the invention, or mixtures thereof with other polymerisable monomers, can be used for surface protection, in moulding materials, as casting resins, etc..

The present application hence relates also to curable mixtures which are suitable for the production of shaped articles including flat-shaped products, and which contain the diacrylic acid esters according to the invention, optionally together with other polymerisable monomers, and the polymerisation catalysts usually employed for polymerisation curing.

The polymerisable mixtures suitable for the production of coatings and moulding materials may additionally contain flexibilising agents, fillers and, preferably, pigments, e.g. titanium dioxide.

Where otherwise not stated, the term "parts" in the following examples denotes parts by weight, and percentages are expressed as per cent by weight; temperatures are given in degrees Centigrade.

PRODUCTION EXAMPLES

Example 1

A mixture of 432.2 g of 1,3-bis-($\beta$-hydroxyethyl)-5,5-dimethylhydantoin (2 moles), 361.2 g of freshly distilled methacrylic acid (4.2 moles), 0.1 g of phenothiazine, 1200 ml of benzene and 10 ml of concentrated sulphuric acid is heated, with vigorous stirring at 130°C bath temperature, to obtain an internal temperature of 78°C. At the same time an azeotropic circulation distillation process is initiated by means of which, as the benzene separated by cooling flows back, the water present in the reaction mixture is continuously removed from the reaction mixture and separated. An amount of 48 ml of water has been separated after 5 hours, and after 18 hours an amount of 70 ml of water (97.2% of theory).

The reaction mixture is then cooled to room temperature, and the benzene solution washed first with a 20% aqueous ammonia solution containing 5% ammonium sulphate, and then with a 5% aqueous ammonium sulphate solution. An addition is made to the organic phase of 3.5 g of hydroquinone (0.5 percent by weight relative to the amount theoretically to be expected at the final point), and concentration by evaporation performed in a rotary evaporator at 50°-60°C under a water-jet vacuum; drying is subsequently carried out at 55°C under 0.2 Torr to obtain constant weight.

An amount of 621 g (88.2% of theory) of a pale yellow, clear, low-viscosity resin is obtained in this manner.

The titrimetrically determined content of methacrylate groups corresponds to 100% of the theoretical content. These determinations of content are performed by the addition of dodecylmercaptan, and iodometrical back titration of the mercaptan excess. The unreacted methacrylic acid molecules are not affected by the method of determination so that this test procedure is also applicable for the assessment of the progress of the reaction. This titration is described by K. Muller in *Zeitschrift fuer analytische Chemie* 18, 135-137 (1961), and by D. W. Beesing et al. in *Analytical Chemistry* 21, 1073 (1949).

The infrared spectrum (capillary absorption) shows, amongst other things, by the absorptions at 1637 $cm^{-1}$, 1718 $cm^{-1}$ and 1776 $cm^{-1}$ that, in addition to the hydantoin and ester-carbonyl frequencies, the C=C absorption is present.

The elementary analysis shows: found: 57.9% C, 6.9% H and 7.8% N (calculated: 57.9% C, 6.9% H, 7.9% N).

The proton-magnetic resonance spectrum (60 Mc-HNMR, taken in deuterochloroform (CDCl₃), against tetramethylsilane (TMS) as internal standard) shows by the following signals, amongst others, that the structure given below agrees:

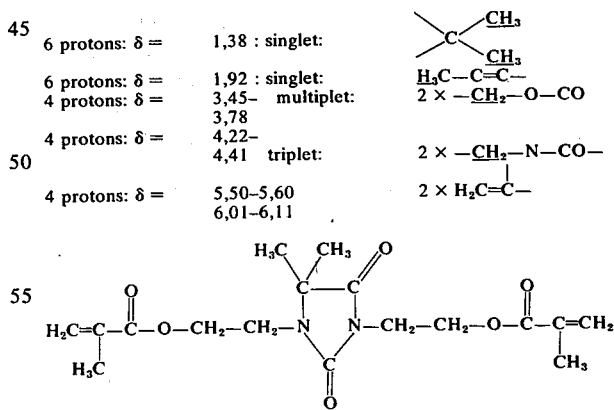

EXAMPLE 2

A mixture of 216.1 g of 1,3-bis-($\beta'$-hydroxyethyl)-5,5-dimethylhydantoin (1 mole), 400 g of methacrylic acid methyl ester (4.0 moles), 0.08 g of phenothiazine and 5 ml of concentrated sulphuric acid is stirred in a glass apparatus provided with stirrer, internal thermometer and 40 cm packed column with fractionating head, at 140°C heating bath temperature. In the course of the reaction the reaction temperature increases from 92° to 96°C. The reflux ratio at the fractionating head is so adjusted that practically only methanol is initially distilled off, this stage taking about 5 hours. The excess methyl methacrylate is then distilled off within 3 hours.

The mixture is diluted with 200 ml of benzene, and washed as described in Example 1. An addition is made to the benzene phase of 1.5 g of hydroquinone and a trace of sodium nitrite, and the whole concentrated in the rotary evaporator at 50°C under a water-jet vacuum; drying is performed at 50°–55°C under 0.15 Torr. A clear yellow resin is obtained (269 g, corresponding to 77% of theory), the acrylate content of which, determined as described in Example 1, corresponds to 100% of theory.

The product is identical to the compound produced according to Example 1.

EXAMPLE 3

The test described in Example 2 is repeated; in this case, however, 457 g of methacrylic acid ethyl ester are used instead of 400 g of methyl methacrylate. At 142°–150°C bath temperature, the reaction time is 5 hours with an internal temperature of 105°–110°C. An amount of 80 ml of ethanol is distilled off in this time ($K_p$ = 78°C) (corresponding to 87% of theory). The subsequent procedure is as described in Example 2; the processing is likewise according to Example 2. An amount of 256.4 g of a clear yellow resin is obtained of which the content of acrylate groups corresponds to 100% of the theoretical content. This dimethacrylic acid ester is likewise identical to the compound produced according to Example 1.

EXAMPLE 4

An amount of 216.1 g of 1,3-bis-($\beta'$-hydroxyethyl)-5,5-dimethylhydantoin (1 mole) and 151.2 g of acrylic acid is esterified with the aid of 5 ml of concentrated sulphuric acid in 600 ml of benzene, with the addition of 0.08 g of phenothiazine, as described more precisely in Example 1. Processing and stabilisation are likewise according to Example 1. An amount of 290 g of a pale-yellow liquid (89.4% theory) is obtained, the purity of which, relative to the content of acrylate groups, is 83% of theory. The proton-magnetic resonance spectrum (60 Mc-HNMR, in CDCl₃ against TMS) shows, by the presence of the following signals, that essentially the below given structure is in agreement:

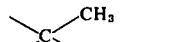
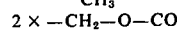
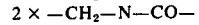
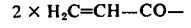

$\delta$ = 1,42 : singlet:
$\delta$ = 3,52–3,95 : multiplet:      2 × —CH₂—O—CO
$\delta$ = 4,30–4,55 : triplet:         2 × —CH₂—N—CO—
$\delta$ = 5,80–6,85 : 2 multiplet:   2 × H₂C=CH—CO—

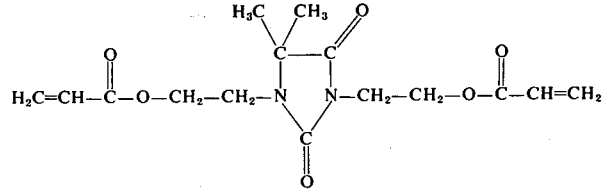

EXAMPLE 5

Corresponding to Example 2, 216.1 g of 1,3-bis-($\beta$-hydroxyethyl)-5,5-dimethylhydantoin (1 mole) are transesterified with 400.5 g of acrylic acid ethyl ester (4 moles) with the use of 0.08 g of phenothiazine and 5 ml of concentrated sulphuric acid. The procedure followed is exactly as described in Examples 2 and 3, and a bisacrylate compound is obtained, in good yield, which completely corresponds to the compound produced according to Example 4.

EXAMPLE 6

An amount of 151.2 g of acrylic acid is esterified with 388 g of crude 1,3-bis-($\beta$-hydroxy-$\gamma$-n-butoxy-n-propyl)-5,5-dimethylhydantoin in 900 ml of benzene with the aid of 5 ml of concentrated sulphuric acid and 0.08 g of phenothiazine, the procedure being as given in Example 4. By carrying out the reaction and processing as in Example 4 a product is obtained (447 g, corresponding to 90.2% of theory) of which the purity, relative to the acrylic ester content, is 72% of theory. The bisacrylate compound corresponds essentially to the following structure:

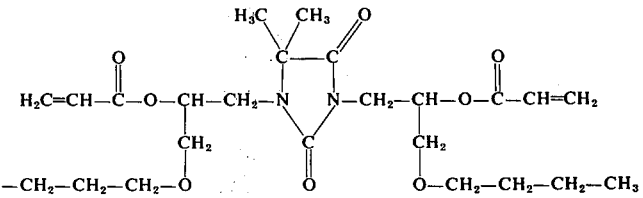

EXAMPLE 7

Following the procedure given in Example 4, 123 g of 1,3-bis-($\beta$-hydroxy-n-propyl)-5,5-dimethyl-6-isopropyl-5,6-dihydrouracil (0.41 mole) are reacted with 62 g of acrylic acid (0.861 mole) in 300 ml of benzene with the use of 3 ml of concentrated sulphuric acid and 0.04 g of phenothiazine.

Processing and stabilisation are carried out as described in Example 1. An amount of 128 g of a yellowish and highly viscous resin (73% of theory) is obtained, of which the content of acrylate groups corresponds to 62% of the theoretical content. The bisacrylate compound corresponds essentially to the following structure:

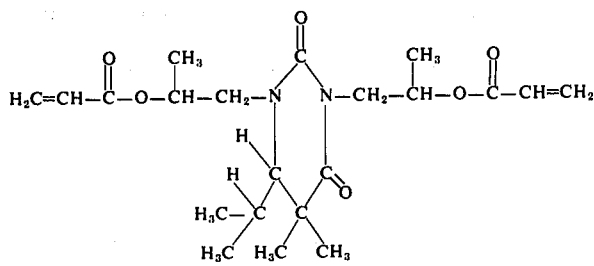

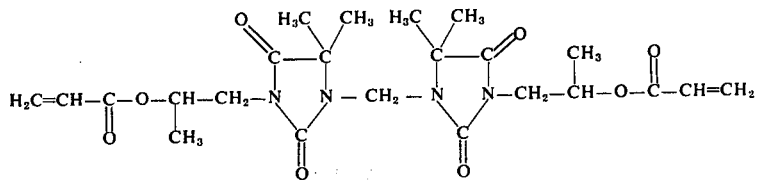

EXAMPLE 8

According to the procedure given in Example 2, an amount of 244 g of 1,3-bis-(β-hydroxy-n-propyl)-5,5-dimethylhydantoin (1 mole) is esterified with 457 g of methyl methacrylate (4 moles), an addition being made of 0.08 g of phenothiazine and 5 ml of concentrated sulphuric acid. After reaction and processing of the product as in Example 2, an amount of 205 g of a brown medium-viscous liquid (54% of theory) is obtained of which the methacrylate content is 70% of theory. The new substance corresponds essentially to the following structure:

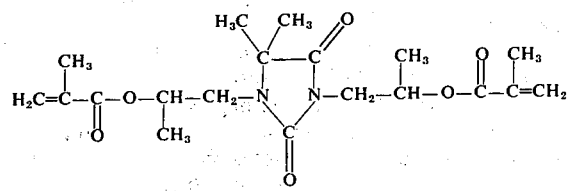

EXAMPLE 9

Analogously to Example 4, an amount of 384.5 g of 1,1'-methylene-bis-[3-(β-hydroxy-n-propyl)-5,5-dimethylhydantoin] (1.0 mole) is esterified with 151 g of acrylic acid (2.1 moles) in 1300 ml of benzene with 25 g of p-toluenesulphonic acid as catalyst under the inhibiting action of 0.08 g of phenothiazine.

Processing and purification are carried out as described in Example 1.

An amount of 418.3 g of a highly viscous, clear, light-ochre-coloured liquid is obtained of which the content of acrylic ester double bonds corresponds to 86.5% of theory. The new diacrylic acid ester corresponds essentially to the following structure:

EXAMPLE 10

In a similar manner to that described in Example 1, an amount of 135.3 g of 1,1'-methylene-bis-[3-(β-hydroxy-n-propyl)-5,5-dimethyl-5,6-dihydrouracil] (0.328 mole) is esterified with 59.5 g of methacrylic acid in 400 ml of benzene.

The catalyst used consists of 20 g of an acid ion exchanger (exchange capacity: 4.5 m val/g); and the stabiliser of 0.03 g of phenothiazine and 0.01 g of triphenylphosphite. After the reaction is completed, the ion exchange resin is removed by filtration, and processing carried out according to Example 1. An amount of 114 g of a clear, colourless to slightly yellowish viscous resin is obtained of which the content of acrylate double bonds is 69.5% of theory. The substance corresponds essentially to the formula:

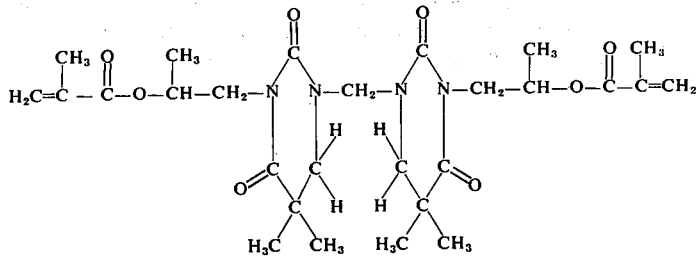

EXAMPLE 11

Analogously to the procedure described in Example 1, an amount of 118 g of 2,2'-bis-[1-(β-hydroxy-propyl)-5,5-dimethyl-hydantoinyl-3]-diethyl ether (0.261 mole) is esterified with 39.5 g of acrylic acid (0.548 mole) in 400 ml of benzene, the esterification reaction being catalysed with 18 g of the ion exchange used in Example 10, and the formed diacrylic acid diester inhibited with 0.03 g of phenothiazine + 0.1 g of triphenyl phosphite. The procedure is carried out as given in Example 10 to obtain 140.2 g (95.7% of theory) of a clear light-ochre-coloured resin. The new diacrylic acid diester corresponds essentially to the following structure:

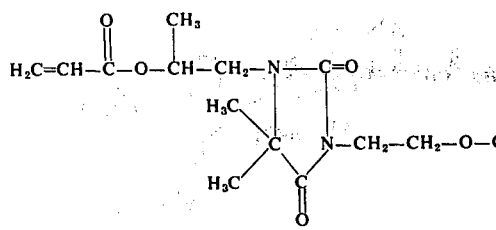

EXAMPLE 12

By means of the procedure described in Example 1, the following mixture is reacted in a glass reaction flask:

366.5 g of 1,3-bis-(β-hydroxy-n-propyl)-5,5-dimethylhydantoin (1.5 moles),
433 g of acrylic acid (3 moles),
900 ml of toluene,
0.3 g of phenothiazine,
1.5 g of triphenylphosphite.

An amount of 25 ml of 50% sulphuric acid is used as catalyst, the addition being made dropwise by degrees.

The above mixture is stirred at 168°C bath temperature, the internal temperature rising in the course of the reaction from 109° to 113°C. The amount of water theoretically to be expected has been separated after about 5 hours. The reaction mixture is then cooled to 25°C and processed. The solution, filtered until clear, is washed twice with 500 ml of water containing 10% of ammonia and 5% of ammonium sulphate. After separation of the aqueous phase, the following inhibitor system of the organic phase is added: 1.7 g of hydroqinone; 0.006 g of pyrocatechol; 0.1 g of 8% copper naphthenate and 0.14 g of sodium nitrite in 0.4 ml of water. The organic phase is subsequently concentrated at 55°C in a rotary evaporator under a water-jet vacuum; and drying to constant weight is afterwards carried out within 2 hours under 0.3 Torr at 55°C. An amount of 468.3 g (88.6% of theory) of a pale yellow, low viscous liquid is obtained containing 5.21 acrylate equivalents/kg, which corresponds to a content of acrylate double bonds of 91.8% of theory. The new diacrylate corresponds essentially to the following structure.

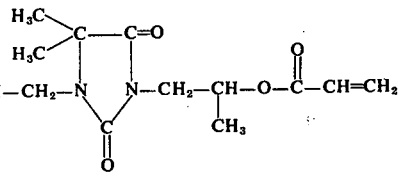

APPLICATION EXAMPLES

EXAMPLE I

An amount of 100 g of the heterocyclic bismethacrylate produced according to Example 1 is mixed with 0.8 g of lauryl peroxide at 60°C, and the mixture poured into an aluminium mould. Polymerisation is carried out for 4 hours at 70°C, 4 hours at 85°C, 4 hours at 100°C and 24 hours at 150°C.

A pale yellow, clear-transparent moulded shape is obtained having the following properties:

flexural strength according to VSM 77103: 10.0–11.5 kp/mm², 
deflection according to VSM 77103: 4.3–4.5 mm,
dimensional stability at elevated temperatures according to Martens, -continued

| | |
|---|---|
| DIN 53 458: | 57°C, |
| dimensional stability according to DIN 53461: | 78°C, |
| cold water absorption (4 days/20°C): | 1.1%. |

EXAMPLE II

An amount of 100 g of the bismethacrylate produced according to Example 2 is mixed with 1.2 g of lauryl peroxide at 60°C; the mixture is then cured for 4 hours at 70°C, 4 hours at 85°C, 4 hours at 100°C, and 24 hours at 120°C. A flexible moulded shape is obtained having a deflection value according to VSM 77103 of 18.6 to over 20 mm.

We claim:

1. A diacrylic acid ester of a bis-hydantoin of the formula $$\begin{array}{c}\text{structure with } R_1, R_2, R_3, R_{14}, R_{15}, R_{16}, R_{17}\end{array}$$

or $$\begin{array}{c}\text{structure with } R_1, R_2, R_3, R_{14}, R_{15}, R_{16}, R_{17}, B\end{array}$$

2. A diacrylic acid ester according to claim 1 of the formula:

3. A diacrylic acid ester according to claim 1 of the formula:
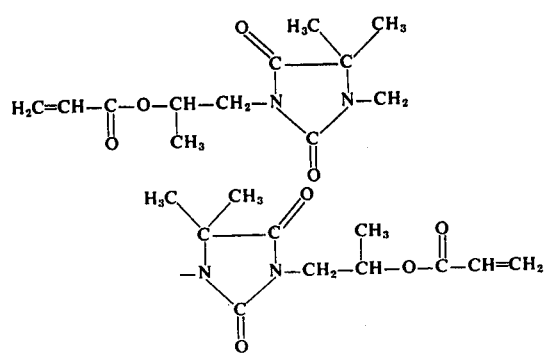
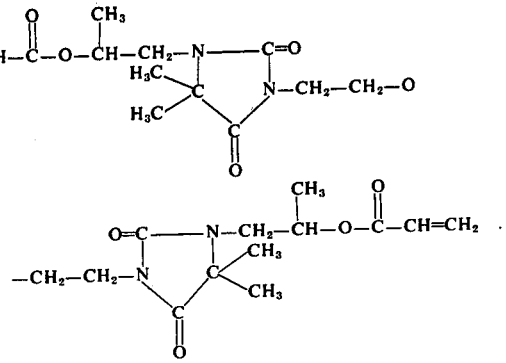
* * * * *

UNITED STATES PATENT AND TRADEMARK OFFICE
CERTIFICATE OF CORRECTION

PATENT NO. : 3,932,176
DATED : January 13, 1976
INVENTOR(S) : Juergen Habermeier and Daniel Porret It is certified that error appears in the above-identified patent and that said Letters Patent are hereby corrected as shown below:

Correction claim 1 after formula on col. 14, line 65.

-- wherein $R_1$ and $R_3$ are independently hydrogen or methyl, $R_2$ is hydrogen, lower alkyl, lower alkyl interrupted by oxygen, or phenyl, or $R_1$ and $R_2$ together represent trimethylene or tetramethylene, $R_{14}$, $R_{15}$, $R_{16}$ and $R_{17}$ are independently hydrogen or alkyl of 1 to 4 carbon atoms, B is alkylene of 1 to 12 carbon atoms or lower alkylene interrupted by oxygen atoms, and m and n are each a whole number having a value of 1 to 30. --

Signed and Sealed this

Thirtieth Day of November 1976

[SEAL]

Attest:

RUTH C. MASON
*Attesting Officer*

C. MARSHALL DANN
*Commissioner of Patents and Trademarks*